US008612621B2

(12) United States Patent
Wang et al.

(10) Patent No.: US 8,612,621 B2
(45) Date of Patent: Dec. 17, 2013

(54) METHOD FOR CONSTRUCTING NETWORK TOPOLOGY, AND STREAMING DELIVERY SYSTEM

(75) Inventors: Zhibing Wang, Shenzhen (CN); Zhefeng Yan, Shenzhen (CN); Haohua Chen, Shenzhen (CN); Jiying Dui, Shenzhen (CN); Yaohui Li, Shenzhen (CN); Jiahao Wei, Shenzhen (CN); Chuansong Xue, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1074 days.

(21) Appl. No.: 12/505,788

(22) Filed: Jul. 20, 2009

(65) Prior Publication Data
US 2009/0282160 A1 Nov. 12, 2009

Related U.S. Application Data

(63) Continuation of application No. PCT/CN2008/071072, filed on May 23, 2008.

(30) Foreign Application Priority Data

Jun. 5, 2007 (CN) .......................... 2007 1 0110570

(51) Int. Cl.
*G06F 15/16* (2006.01)
(52) U.S. Cl.
USPC .......................................... 709/231; 709/203
(58) Field of Classification Search
USPC ................................................ 709/231, 203
See application file for complete search history.

(56) References Cited

U.S. PATENT DOCUMENTS

| 7,499,981 | B2* | 3/2009 | Harrow et al. ............... 709/217 |
| 7,644,173 | B1* | 1/2010 | Zhang ........................... 709/231 |
| 7,925,781 | B1* | 4/2011 | Chan et al. ................... 709/238 |
| 2004/0143672 | A1 | 7/2004 | Padmanabham et al. | |
| 2005/0187946 | A1 | 8/2005 | Zhang et al. | |

(Continued)

FOREIGN PATENT DOCUMENTS

| CN | 1604569 | 4/2005 |
| CN | 1747446 A | 3/2006 |

(Continued)

OTHER PUBLICATIONS

English Translation of Written Opinion of the International Searching Authority for PCT Application No. PCT/CN2008/071072, mailed Aug. 28,2008, 4 pp.

(Continued)

*Primary Examiner* — Lynn Feild
*Assistant Examiner* — Lin Liu
(74) *Attorney, Agent, or Firm* — Conley Rose, P.C.; Grant Rodolph; Nicholas K. Beaulieu

(57) ABSTRACT

A method for constructing a network topology is applied in a streaming delivery system. The streaming delivery system includes: a center server (CS-P), an edge server (ES-P), a request scheduling server (RRS-P), and a client. The disclosed embodiments utilizes the upload capabilities of the client to transmit a part of streaming data, thus consuming fewer center server resources. By constructing the network topology, the disclosed embodiments enable the client to obtain a part of streaming data from other clients, reduces the load capability requirements for the server, and ensures that a streaming delivery network may provide streaming live services with higher bandwidths and better quality.

20 Claims, 6 Drawing Sheets

(56) References Cited

U.S. PATENT DOCUMENTS

| | | | |
|---|---|---|---|
| 2006/0230107 A1* | 10/2006 | Yu et al. ........................ | 709/204 |
| 2006/0259607 A1 | 11/2006 | O'Neal et al. | |
| 2008/0205291 A1* | 8/2008 | Li et al. ........................ | 370/254 |
| 2010/0235432 A1* | 9/2010 | Trojer ........................... | 709/203 |
| 2010/0241747 A1* | 9/2010 | Guo et al. ..................... | 709/225 |
| 2011/0302661 A1* | 12/2011 | Dunkeld et al. ................ | 726/28 |

FOREIGN PATENT DOCUMENTS

| | | |
|---|---|---|
| CN | 1953413 | 4/2007 |
| CN | 1964319 | 5/2007 |
| CN | 1968275 A | 5/2007 |
| CN | 101068186 A | 11/2007 |
| WO | WO 2007/039576 | 4/2007 |

OTHER PUBLICATIONS

European Patent Office Communication in Application No. 08748674.2, which encloses an extended European search report which includes, pursuant to Rule 62 EPC, the supplementary European search report (Art. 153(7)) EPC) and the European search opinion, dated Jan. 21, 2010, 9 pp.

Yang, Chuan-dong, et al., "Research on a Hybrid Architecture for Media Streaming Distribution", Computer Applications, vol. 25, No. 9, Sep. 2005, 1994-2010 China Academic Journal Electronic Publishing House, 4 pp.

Tian, Ruixiong et al., "HAG-Based Application Layer Multicast System for Streaming Media", J. Tsinghua Unversity (Science and Technology), 2004, vol. 44, No. 4, 1994-2010 China Academic Journal Electronic Publishing House, 5 pp.

Wang, Zhao, "Application of Application—Level Multicast Based on P2P in Streaming Media", China University of Mining and Technology, Department of Computer Science and Technology, Feb., 2005, 1994-2010 China Academic Journal Electronic Publishing House, 3 pp.

Xu, Dongyan et al., "Analysis of a CDN-P2P Hybrid Archietecture for Cost-Effective Streaming Media Distribution", Multimedia Systems, Springer, Berlin, Germany, vol. 11, No. 4, Apr. 1, 2006, pp. 383-399.

Hefeeda, Mohamed M., et al., "A Hybrid Architecture for Cost-Effective On-Demand Media Streaming", Computer Networks, Elsevier Science Publishers B.V., Amsterdam, IL, vol. 44, No. 3, Feb. 20, 2004, pp. 353-382.

Official Communication issued on Oct. 13, 2011 by the European Patent Office in counterpart European Application No. 08748674.2 (4 pages).

Castro, M., et al., "Splitstream: High—Bandwidth Multicast in Cooperative Environments", SOSP 2003, Oct. 19-22, 2003, Bolton Landing, New York, 16 pp.

International Search Report from P.R. China in International Application No. PCT/CN2008/071072 mailed Aug. 28, 2008.

* cited by examiner

METHOD FOR CONSTRUCTING NETWORK TOPOLOGY, AND STREAMING DELIVERY SYSTEM

CROSS-REFERENCE TO RELATED APPLICATION

This application is a continuation of International Application No. PCT/CN2008/071072, filed on May 23, 2008, titled "A METHOD FOR CLIENT NODE NETWORK TOPOLOGY CONSTRUCTION AND A SYSTEM FOR STREAM MEDIA DELIVERY", which claims the priority of CN application No. 200710110570.6, filed on Jun. 5, 2007, titled "A METHOD FOR CLIENT NODE NETWORK TOPOLOGY CONSTRUCTION AND A SYSTEM FOR STREAM MEDIA DELIVERY", the entire contents of all of which are incorporated herein by reference.

FIELD OF THE DISCLOSURE

The present disclosure relates to computer network technologies, and in particular, to a method for constructing a network topology, a streaming delivery system, and a method for system-related entities and clients to join the streaming delivery system.

BACKGROUND OF THE DISCLOSURE

A content/media delivery network (CDN/MDN) has emerged in the conventional art, delivering website contents from a source node to an edge node closest to a user so that the user may obtain desired contents proximately, thus increasing the response speed when the user visits a website. For multimedia content, such as video on demand (VoD) and live video, because video contents are transmitted in real time and large volumes, delivering video content to an edge node closest to a user assures better quality of play for the user and significantly reduces impact on the backbone network.

The structure of a CDN/MDN in the conventional art is shown in FIG. 1. The CDN/MDN includes:

a global server load balancer (GSLB), adapted to schedule a media content request of a user to an edge node closest to the user;

a server load balancer (SLB), responsible for routing the content requests of local users, balancing loads, and selecting a best media server (MS) according to the content distribution and device load conditions, and a media manager (MM), adapted to deliver media contents and schedule MSs between the center and edges, between edges and within an edge node.

In the CDN/MDN structure shown in FIG. 1, because the MS bandwidth is fixed in an edge node, the edge node may only serve a limited number of users. To satisfy users' needs, the capability of an edge node needs to increase linearly with the growth of users. Thus, for the CDN/MDN structure in the conventional art, huge investments are required in an edge node. Because service requests of a user are indefinite, even though the system capability of the edge node is increased, it is difficult to fully meet all abrupt rises of user requests. As a result, once the number of concurrent user requests in an area exceeds the maximum capacity of the network, the network may only reject the service.

At present, many pure peer to peer (P2P) steaming software systems are already available on the Internet. A common feature of these systems is that they are able to set up mutual aid relations between clients via a scheduling module in the network. Streaming servers in the network provide only a few streams and clients (peer nodes) deliver streaming data to each other by means of the above mutual aid relations so that a large number of clients may watch streaming programs at the same time. The scheduling module does not record topology relations of node networks, and the peer nodes help each other in a best-effort way. The inventor finds that the P2P streaming software system in the conventional art does not appear to consider geographic issues, which may result in a large volume of traffic across backbone networks. Moreover, because the scheduling module does not record the topology relations of node networks and does not provide unified resource scheduling, data delivery basically relies on the mutual aid of nodes. Therefore, channel switching may take a long time and programs of large streams may be difficult to support. In addition, the unsteady nodes and the best-effort help mode may also result in unstable playing of programs.

In conclusion, the streaming system based on client/server mode in the conventional art causes a heavy load on the MS, whether in center mode or center-edge distribution mode. The capability of the MS determines the number of users that are served at the same time. Thus, to meet the streaming application requirements of a large number of users, streaming service providers must pour huge investments in the server. For streaming live services based on P2P technology, because the server has limited resources and may provide only few streaming data and most of nodes rely on the upload capabilities of other nodes to watch video programs, it is difficult to guarantee the quality of service (QoS). In addition, due to limitation of upload capabilities, the P2P technology cannot provide live programs at a high bit rate.

SUMMARY

Disclosed embodiments provide a method for constructing a network topology and a streaming delivery system to increase the streaming transmission rate and improve the playing quality compared with the conventional art.

A method for constructing a network topology is provided. The method includes:

receiving a request sent from a client for joining a system;

returning information about available edge servers to the client, and returning IDs of specified data sub-streams transmitted by the client; and when determining that sub-trees corresponding to the specified data sub-streams have lower-level trunk nodes, returning information about the lower-level trunk nodes of the sub-trees, where the sub-trees are established in advance for the data sub-streams sent by a center server to the edge servers.

A streaming delivery system is provided. The system includes:

a center server, adapted to slice streaming data into multiple data sub-streams and send these data sub-streams;

an edge server, adapted to buffer the data sub-streams sent from the center server, and send the data sub-streams to a client node that joins the system; and a request scheduling server, adapted to establish, store and update information about client network topologies and idle nodes, which specifically including the following operations:

receiving a request sent from the client for joining the system, returning information about available edge servers to the client, returning IDs of specified data sub-streams transmitted by the client, and returning information about lower-level trunk nodes of sub-trees when determining that the sub-trees corresponding to the specified data sub-streams have lower-level trunk nodes.

A request scheduling server is provided. The request scheduling server includes:

a receiving unit, adapted to receive a request initiated by a client for joining a system; and an information delivering unit, adapted to: return information about available edge servers to the client, return IDs of specified data sub-streams transmitted by the client, and return information about lower-level trunk nodes of sub-trees when determining that the sub-trees corresponding to the specified data sub-streams have lower-level trunk nodes, where the sub-trees are established in advance for the data sub-streams sent by a center server to the edge servers.

A client is provided. The client includes: a joining system function unit, a exiting system function unit, a joining system function unit, adapted to: initiate a request for joining a system to a request scheduling server, receive information returned by the request scheduling server, including information about edge servers, information about IDs of specified data sub-streams to be transmitted, information about lower-level trunk nodes of sub-trees corresponding to the specified data sub-streams, and information about idle nodes that transmit other data sub-streams; and send the received information about edge servers, IDs of specified data sub-streams, and information about lower-level trunk nodes to a trunk function unit, and send the received information about idle nodes to a leaf function unit;

a exiting system function unit, adapted to send a system exiting message to the request scheduling server and other connected clients, and disconnect the request scheduling server and other connected clients;

the trunk function unit, adapted to: establish connections with the edge servers or one of the lower-level trunk nodes with which the joining system function unit communicates, add the client to the sub-trees as a trunk node to receive the specified sub-streams, send the data sub-streams to a streaming playing unit, and transmit the specified data sub-streams to connected leaf nodes;

the leaf function unit, adapted to: establish connections with the idle nodes transmitting other data sub-streams sent by the joining system function unit, use the client as a leaf node of the sub-trees corresponding to other data sub-streams to receive other data sub-streams, and send the data sub-streams to the streaming playing unit; and the streaming playing unit, adapted to combine the received data sub-streams into streaming data, and play the streaming data using a local player.

A method for a client to join a streaming delivery system according to some embodiments is provided: The method includes:

originating a request for joining the system to a request scheduling server, and receiving information, returned by the request scheduling server, about edge servers, IDs of specified data sub-streams transmitted, and information about lower-level trunk nodes returned when the request scheduling server determines that sub-trees corresponding to the specified data sub-streams have lower-level trunk nodes;

establishing connections with the edge servers or one of the lower-level trunk nodes, joining the sub-trees as a trunk node to receive the specified data sub-streams, and transmitting the specified data sub-streams to connected leaf nodes; and when acting as a trunk node, reporting, to the request scheduling server, node status information that includes a trunk node connection relationship and information about whether the current node is idle.

A computer readable storage medium according to some embodiments may be adapted to store a computer program, where the computer program may enable the processor to carry out the following process:

receiving a request sent from a client for joining a system; and returning information about available edge servers to the client, and returning IDs of specified data sub-streams transmitted by the client; when determining that sub-trees corresponding to the specified data sub-streams have lower-level trunk nodes, returning information about the lower-level trunk nodes of the sub-trees, where the sub-trees are established in advance for the data sub-streams sent by a center server to the edge servers.

A computer readable storage medium according to some embodiments may be adapted to store a computer program, where the computer program may enable the processor to carry out the following process:

originating a request for joining a system to a request scheduling server, and receiving information, returned by the request scheduling server, about edge servers, IDs of specified data sub-streams transmitted, and information about lower-level trunk nodes returned when the request scheduling server determines that sub-trees corresponding to the specified data sub-streams have lower-level trunk nodes;

establishing connections with the edge servers or one of the lower-level trunk nodes, joining the sub-trees as a trunk node to receive the specified data sub-streams, and transmitting the specified data sub-streams to connected leaf nodes; and when acting as a trunk node, reporting, to the request scheduling server, node status information that includes a trunk node connection relationship and information about whether the current node is idle.

The disclosed embodiments may transmit a part of streaming data by constructing a network topology between clients, and reduce the load of the ES-P content server. Therefore, compared with the P2P streaming live networks, the embodiments provide live services with larger bandwidths and better quality. In addition, the streaming delivery network according to some embodiments avoids the impacts of long distance data transmission between the nodes on the backbone network during the P2P live cast, and limits the data transmission between the nodes to the network edge. This facilitates the mutual-aid downloading of streaming data between the nodes and recovers the network topology quickly when the nodes exit, reducing network disturbances effectively.

DETAILED DESCRIPTION OF THE EMBODIMENTS

Consistent with some embodiments, a network topology between clients is constructed, so that a client may obtain a part of streaming data (furthermore, the rest of streaming data may still be requested from a content server) from other clients. This lowers the load requirements for the server without affecting the QoS. A network topology is constructed between the clients to limit the connection between the clients in a partial network in some embodiments, thus guaranteeing the transmission quality and reducing the traffic across networks.

The following describes major principles, implementation modes, and benefits of the technical solution according to some embodiments with reference to the accompanying drawings.

Figure 1:
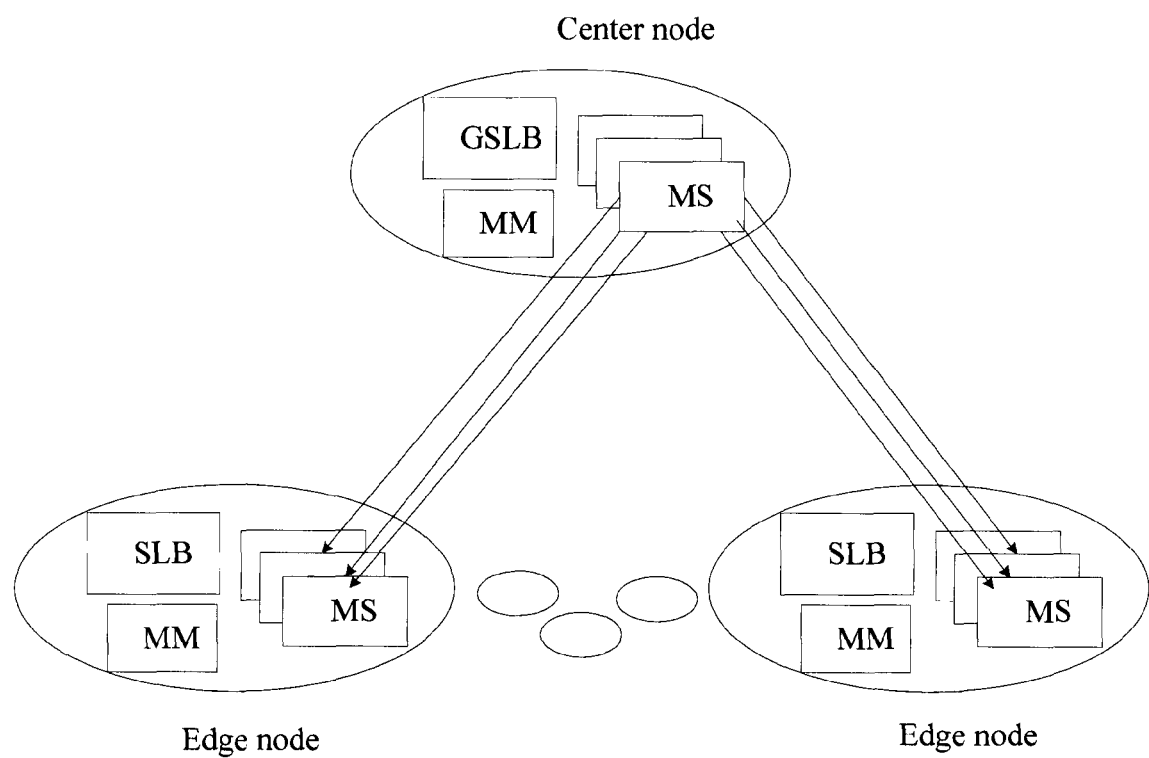
FIG. 1 shows a structure of a CDN/MDN in the conventional art.
Figure 2:
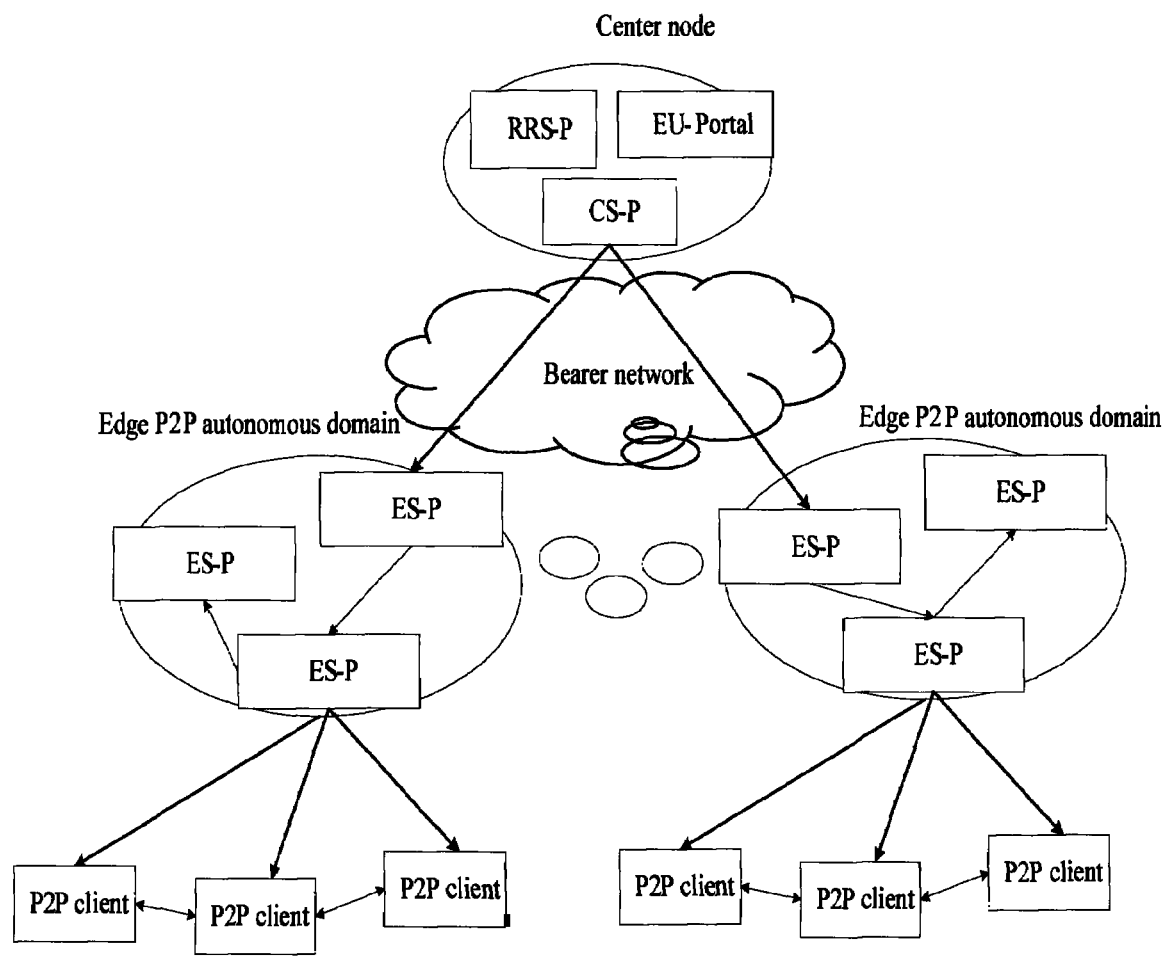
FIG. 2 shows a structure of a streaming delivery system according to some embodiments.

The structure of a streaming delivery system according to some embodiments is shown in FIG. 2. The streaming delivery system includes: an end user portal (EU-Portal), a center server that supports P2P technology (CS-P), a request scheduling server that supports P2P technology (RRS-P), an edge server that supports P2P technology (ES-P), and multiple P2P clients.

The CS-P, RRS-P, and ES-P in the streaming delivery system are configured in the 1+1+N mode. In other words, one pair of CS-Ps, one pair of RRS-Ps and more than one ES-P are configured; the neighboring ES-Ps form a P2P autonomous domain; and each ES-P in a same edge P2P autonomous domain shares the received data sub-streams.

The EU-Portal is responsible for displaying and searching for streaming live contents to play different streaming programs on users' demands.

The CS-P is adapted to slice the streaming data into multiple data sub-streams, and send the data sub-streams to the ES-P. The CS-P slices the streaming data into n data slices and generates m redundant slices by using a redundancy algorithm. After encoding the n data slices and m redundant slices into n+m independent data sub-streams, the CS-P sends these data sub-streams to the ES-P. Taking a 1 Mbps stream as an example, the traffic per second is sliced to 20 parts based on time and 22 packets are generated by using the Reed-Solomon algorithm. This means that the entire stream is sliced to 22 sub-streams, which are sent to the ES-P.

The ES-P is adapted to buffer the received data sub-streams, and send the sub-streams to a P2P client that joins the system.

The RRS-P is adapted to store the ES-P network topology, establish and store the P2P network topology. Each P2P network topology includes n+m sub-trees, where each sub-tree is adapted to transmit data sub-streams sent by a CS-P to the ES-Ps. The RRS-P is further adapted to store the information, reported by the P2P clients, about an idle node, where the idle node refers to a trunk node of which the quantity of connected leaf nodes does not reach a preset threshold.

The P2P client is adapted to: initiate a request for joining a system or a request for exiting a system to the RRS-P; receive the ES-P information returned by the RRS-P, IDs of specified data sub-streams transmitted by the P2P client, information about lower-level trunk nodes of the sub-trees returned when the RRS-P determines that the sub-trees corresponding to the specified data sub-streams have lower-level trunk nodes, information about idle nodes that transmit other data sub-streams returned when the RRS-P determines that there are idle nodes that transmit other data sub-streams and the P2P client requests joining the system as a watching node; join the sub-trees to receive and transmit the specified data sub-streams as a trunk node, establish connections with the returned idle nodes that transmit other data sub-streams, and receive other data sub-streams as a leaf node of the sub-trees corresponding to other data sub-streams; combine the received data sub-streams into streaming data, and play the combined streaming data using a local player.

Specifically, more than one ES-P is available in the system, and multiple neighboring ES-Ps form an edge P2P autonomous domain. Each ES-P in a same edge P2P autonomous domain shares the received data sub-streams.

Further, in the RSS-P, each streaming live channel stores a P2P network topology for each edge P2P autonomous domain.

Moreover, the RRS-P includes:

a receiving unit, adapted to receive a request for joining a system initiated by a client;

an information delivering unit, adapted to return the information about available ES-Ps to the client, return IDs of specified data sub-streams transmitted by the client, and return the information about the lower-level trunk nodes of the sub-trees when determining that the sub-trees corresponding to the specified data sub-streams have lower-level trunk nodes, where the sub-trees are established in advance for the data sub-streams sent by the CS-P server to the ES-Ps.

Figure 3:
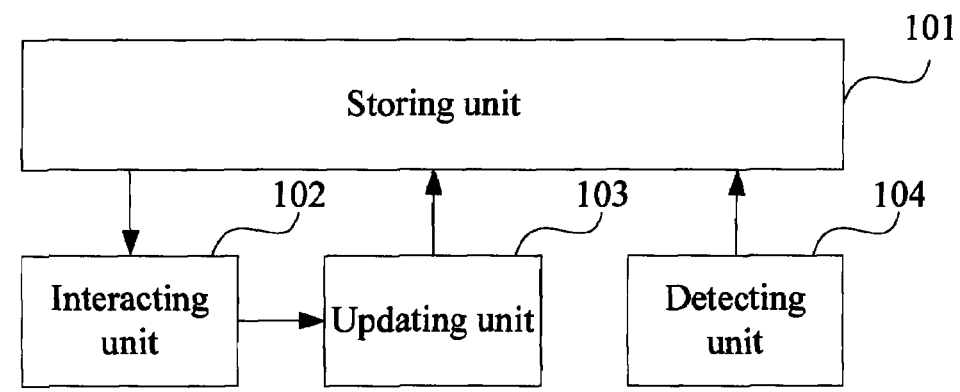
FIG. 3 shows a structure of an RRS-P in a streaming delivery system according to some embodiments.

FIG. 3 shows a preferred RRS-P according to some embodiments, wherein the RRS-P includes a storing unit 101, an interacting unit 102, an updating unit 103, and a detecting unit 104.

The storing unit 101 is adapted to store the ES-P network topology, P2P network topology, and idle nodes information in the streaming delivery system.

The interacting unit 102 is adapted to receive a request for joining a system initiated by a P2P client, and return the information about available ES-Ps, information about lower-level trunk nodes of sub-trees corresponding to the specified data sub-streams transmitted by the P2P client, and information about idle nodes that transmit other data sub-streams, to the P2P client according to information, about the network topology and idle nodes, stored in the storing unit 101.

The interacting unit 102 is further adapted to receive the node status information, reported by the P2P client after the P2P client joins the system, which includes a trunk node connection relationship and information about whether the current node is idle, and send the received node status information to the updating unit 103; receive an exiting system message sent from the P2P client, and send the received exiting system message to the updating unit 103.

The updating unit 103 is adapted to update the P2P network topology and idle node information stored in the storing unit 101 according to the node status information and system exiting message sent from the interacting unit 102.

The detecting unit 104 is adapted to detect whether the P2P client exits for exceptional reasons, and update the P2P network topology stored in the storing unit 101 when detecting that the P2P client exits for exceptional reasons.

Figure 4:
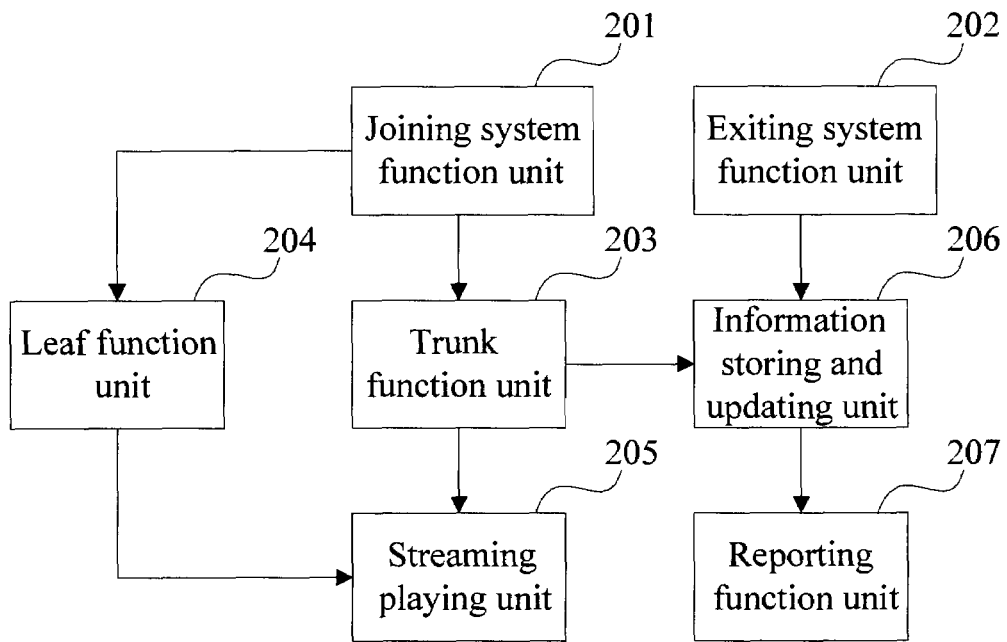
FIG. 4 shows a structure of a P2P client in a streaming delivery system according to some embodiments.

FIG. 4 shows a P2P client according to some embodiments, where the P2P client includes a joining system function unit 201, a exiting system function unit 202, a trunk function unit 203, a leaf function unit 204, a streaming playing unit 205, an information storing and updating unit 206, and a reporting function unit 207.

The joining system function unit 201 is adapted to initiate a request for joining a system to the RRS-P in the streaming delivery system, receive the information returned by the RRS-P, including ES-P information, information about lower-level trunk nodes of the sub-trees corresponding to the specified data sub-streams transmitted by the P2P client, and information about idle nodes that transmit other data sub-streams, and send the received ES-P information and information about lower-level trunk nodes to the trunk function unit 203, and the received information about idle nodes to the leaf function unit 204.

The exiting system function unit 202 is adapted to send a exiting system message to the RRS-P and other connected P2P clients, and disconnect these connections; receive the exiting system messages sent from other P2P clients; and notify the information storing and updating unit 206.

The trunk function unit 203 is adapted to establish connections with the ES-Ps or one of the lower-level trunk nodes sent by the joining system function unit 201, add the P2P client to the sub-trees as a trunk node to receive the specified data sub-streams, send the data sub-streams to the streaming playing unit 205, transmit the specified data sub-streams to the connected leaf nodes, and send the trunk node connection relationship and quantity of connected leaf nodes to the information storing and updating unit 206.

The leaf function unit 204 is adapted to: establish connections with the idle nodes transmitting other data sub-streams that are sent by the joining system function unit 201, use the client as a leaf node of the sub-trees corresponding to other data sub-streams to receive other data sub-streams, and send the data sub-streams to the streaming playing unit 205.

The streaming playing unit 205 is adapted to combine the received data sub-streams into streaming data, and play the streaming data using a local player.

The information storing and updating unit 206 is adapted to receive the notification sent from the exiting system function unit 202 and the trunk node connection relationship sent from the trunk function unit 203; update and store the upper-level trunk node information about the trunk; determine whether the current node is idle according to the quantity of connected leaf nodes; receive, store or send the upper-level trunk node information to the trunk child nodes, and receive, store or send the idle node information to upper-level and lower-level trunk nodes and leaf nodes.

The reporting function unit 207 is adapted to obtain the trunk node connection relationship and information about whether the current node is idle from the information storing and updating unit 206, and report the node status information that includes the trunk node connection relationship and information about whether the current node is idle to the RRS-P.

Figure 5:
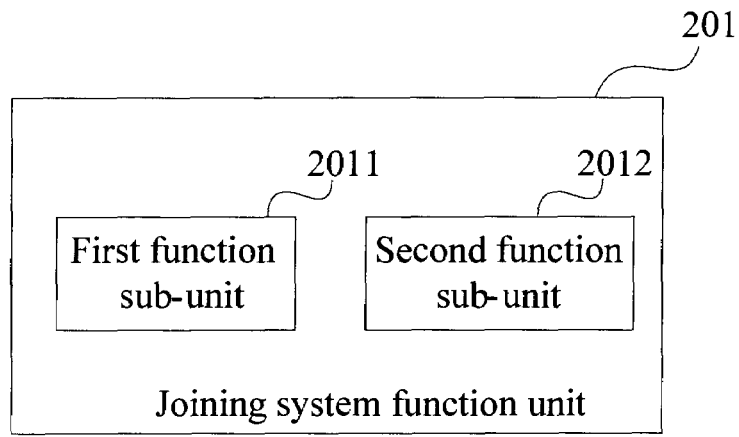
FIG. 5 shows another structure of a P2P client in a streaming delivery system according to some embodiments.

Specifically, the joining system function unit 201 shown in FIG. 5 includes:

a first function sub-unit 2011, adapted to initiate a request for joining a system to the RRS-P, where the request indicates that the P2P client joins the system as a watching node; receive the information returned by the RRS-P, including ES-P information, information about idle nodes that transmit other data sub-streams, and information about lower-level trunk nodes of the sub-trees corresponding to the specified data sub-streams transmitted by the P2P client; send the received ES-P information and information about lower-level trunk nodes to the trunk function unit 203, and the received information about idle nodes to the leaf function unit 204; and a second function sub-unit 2012, adapted to initiate a request for joining a system to the RRS-P, where the request indicates that the P2P client joins the system as a help node; receive the information returned by the RRS-P, including ES-P information and information about lower-level trunk nodes of the sub-trees corresponding to the specified data streams transmitted by the P2P client; and send the received ES-P information and information about lower-level trunk nodes to the trunk function unit 203.

A method for constructing a network topology according to some embodiments may include:

receiving a request sent from a client for joining a system; and returning the information about available ES-Ps to the client, and returning IDs of specified data sub-streams transmitted by the client; when determining that sub-trees corresponding to the specified data sub-streams have lower-level trunk nodes, returning the information about the lower-level trunk nodes of the sub-trees, where the sub-trees are established in advance for the data sub-streams sent by the CS-P to the ES-Ps.

Further, a preferred method for constructing the P2P network topology is as follows:

The RRS-P establishes multiple sub-trees for the data sub-streams sent by the CS-P to the ES-Ps. Each sub-tree is used to transmit a data sub-stream and includes one or more trunks. Each trunk node includes only one trunk child node. Each trunk child node is connected to one or more leaf nodes. Each trunk node and leaf node serve as a P2P client. A P2P client is used as a trunk node of only one trunk, but may be used as a leaf node of multiple sub-trees.

After receiving the request for joining a system from the P2P client, the RRS-P returns the information about available ES-Ps, IDs of specified data sub-streams transmitted by the P2P client, information about lower-level trunk nodes (if any) of the sub-trees corresponding to the specified data sub-streams, and information about idle nodes (if any) that transmit other data sub-streams, to the P2P client.

After joining the sub-trees, the P2P client reports the node status information that includes a trunk node connection relationship and information about whether the current node is idle to the RRS-P according to the information about connected trunk nodes and quantity of leaf nodes. After receiving the node status information reported by the P2P client, the RRS-P updates the locally stored P2P network topology and information about idle nodes.

After receiving a system exiting message sent from the P2P client, the RRS-P updates the locally stored P2P network topology.

Specifically, the RRS-P establishes n sub-trees according to n (the quantity of) data sub-streams sent by the CS-P to the ES-Ps, where each sub-tree is used to transmit a data sub-stream.

The initial values of the trunk nodes and leaf nodes of each sub-tree are null. The RRS-P specifies n P2P clients that are connected first as the first trunk nodes of the sub-trees that transmit each data sub-stream. The RRS-P also returns the information about available ES-Ps, information about specified data sub-streams transmitted by the P2P clients, and information about idle nodes that transmit other data sub-streams.

The RRS-P sets the threshold for the quantity of trunk nodes of each sub-tree. When receiving a request for joining a system from a P2P client, the RRS-P specifies a sub-tree for the P2P client to join, and checks whether the quantity of trunk nodes of the sub-tree reaches the preset threshold. If the quantity of trunk nodes of the sub-tree does not reach the preset threshold, the RRS-P returns the information about lower-level trunk nodes of the sub-tree.

If the quantity of trunk nodes of the sub-tree reaches the preset threshold, the RRS-P instructs the P2P client to obtain the specified data sub-streams that are transmitted from the returned ES-Ps, and creates trunks.

In this embodiment, the original streaming data is encoded into multiple independent sub-streams, for example, s1, s2, s3, ..., sn, and each sub-stream is transmitted by constructing an independent topology. The topology tree that transmits sub-stream s1 is called sub-tree s1, and the topology tree that transmits sub-stream sn is called sub-tree sn. To watch streaming programs, a P2P client needs to join multiple sub-trees to obtain different sub-streams of streaming data, and decodes the sub-streams into original media data.

Figure 6:
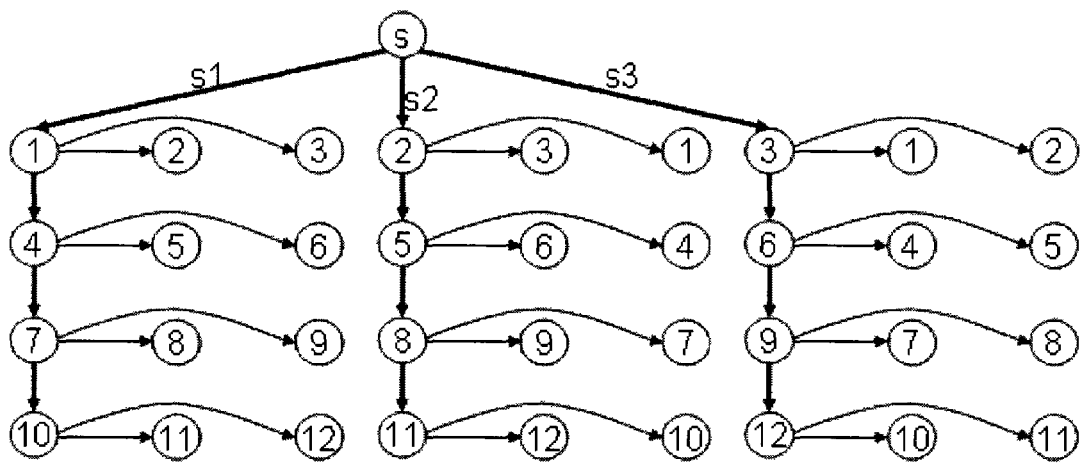
FIG. 6 shows a P2P network topology according to some embodiments.

FIG. 6 shows a network topology of a P2P client according to some embodiments. Streaming data stream s is divided into three independent sub-streams s1, s2 and s3, which form sub-trees s1, s2 and s3. In sub-tree s1, nodes 1, 4, 7, and 10 are trunk nodes; in sub-tree s2, nodes 2, 5, 8 and 10 are trunk nodes; in sub-tree s3, nodes 3, 6, 9 and 12 are trunk nodes. Each trunk node has a unique trunk child node. Taking sub-tree s1 as an example, trunk node 1 is the trunk parent node of trunk node 4; trunk node 7 is the trunk child node of trunk node 4; and trunk node 4 has a unique trunk parent node 1 and a unique trunk child node 7.

Nodes 2, 3, 5, 6, 8, 9, 11 and 12 are the leaf nodes of sub-tree s1. The leaf nodes may obtain sub-stream s1 only through the trunk node, but cannot forward sub-stream s1. For example, in FIG. 6, nodes 2 and 3 establish connections with trunk node 1 of sub-tree s1, and act as the leaf nodes of node 1 to obtain sub-stream s1 from node 1.

To join the system as a watching node, the trunk nodes of sub-tree s1 still need to obtain sub-streams s2 and s3 and act as the leaf nodes of sub-trees s2 and s3 so as to obtain the complete data stream. In FIG. 6, node 1 joins sub-tree s2 to obtain sub-stream s2 and acts as a leaf node of sub-tree s2, and its leaf parent node is trunk node 2 of sub-tree s2. In addition, node 1 also joins sub-tree s3 and acts as a leaf node of sub-tree s3, and its leaf parent node is trunk node 3 of sub-tree s3.

Leaf nodes 2, 3, 5, 6, 8, 9, 11 and 12 of sub-tree s1 are also trunk nodes of sub-tree s2 or s3. Certainly, these nodes may not act as trunk nodes of any sub-tree but only act as the leaf nodes of each sub-tree to obtain sub-streams from the trunk nodes.

If a node cannot obtain all the data sub-streams from other nodes in P2P mode, the node requests the data sub-streams from the ES-P.

Figure 7:
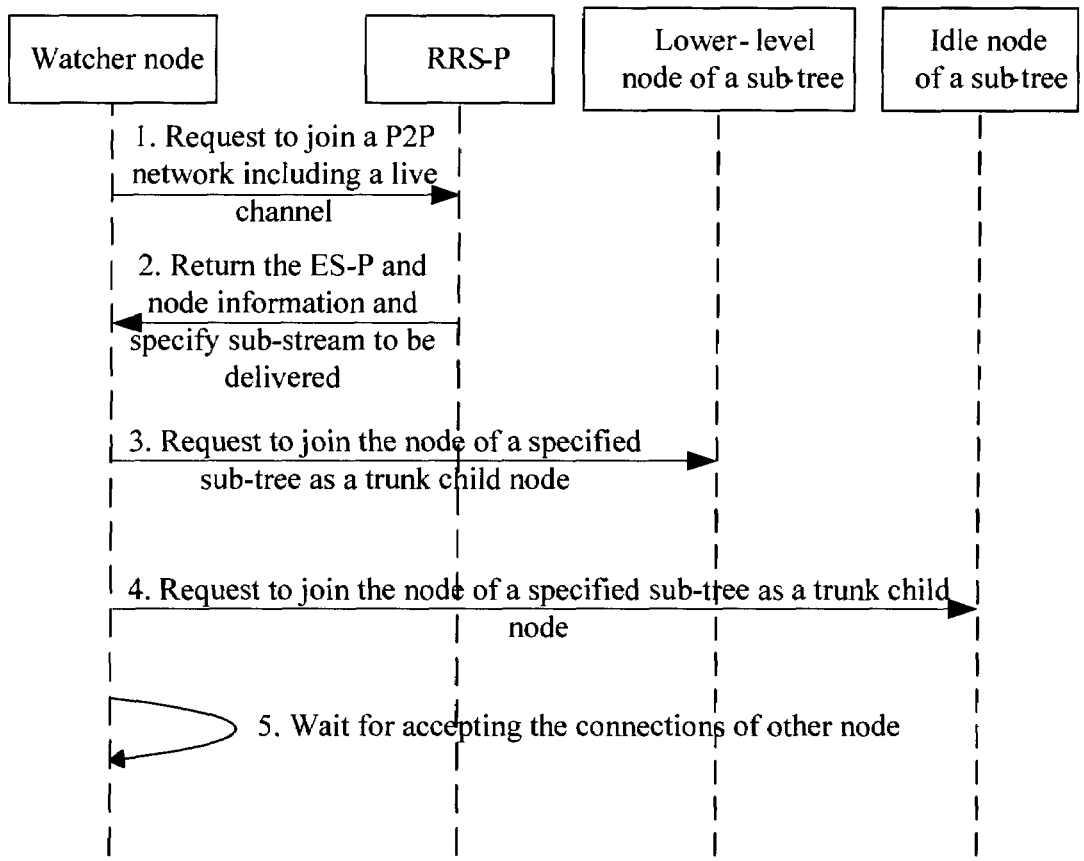
FIG. 7 shows a process for a P2P client to join a streaming delivery system according to some embodiments.

Based on the streaming delivery system and P2P network topology according to the preceding embodiments, this embodiment may provide a method of joining a streaming delivery system by a P2P client. As shown in FIG. 7, this method includes the following steps:

Step 1: P2P client N1, as a watching node, requests joining a live channel of the P2P network. P2P client N1 sends a request for joining a system to the RRS-P, where the request carries the live channel to be joined, and IP address and port number of N1.

The RRS-P needs to judge whether the IP address and port number carried in the request sent by node N1 are the same as the actual ones of N1. If the IP address and port number carried in the request sent by node N1 are not the same as the actual ones of N1, N1 is connected as a private network node after network address translation (NAT), and cannot receive connection requests. Thus, N1 cannot act as a trunk node to forward data sub-streams to other P2P clients, but may only receive and watch streaming programs. If the IP address and port number carried in the request sent by node N1 are the same as the actual ones of N1, N1 is a public network node and may receive connection requests and act as a trunk node to forward data sub-streams.

Step 2: According to the actual IP address of N1, the RRS-P selects one or more ES-Ps that are closer to N1 in the network and have idle resources, and returns the ES-P information to N1. Generally, the RRS-P may select an ES-P with idle bandwidths and light CPU loads that is in the autonomous domain of N1.

If N1 is a public network node, the RRS-P may further specify the data sub-streams that are delivered by N1. For example, if the RRS-P specifies N1 to deliver sub-stream s1, that is, it specifies N1 to join sub-tree s1 as a trunk node, the RRS-P needs to return the information about lower-level trunk nodes of sub-tree s1 that are in the autonomous domain of N1 to N1. To control transmission delay, there cannot be too many trunk node levels in each sub-stream. Thus, each sub-stream may have multiple trunks, and there may be multiple lower-level trunk nodes. The RRS-P needs to return a certain number of lower-level trunk nodes of sub-tree s1 to N1. The trunk levels need to be considered when the RRS-P returns the lower-level trunk nodes. For trunks with more than a certain number of levels, the RRS-P may not return the lower-level trunk nodes to N1. For other sub-trees, because N1 does not need to deliver the sub-streams that are transmitted by the sub-trees, the RRS-P may freely select some idle nodes (must be trunk nodes with the quantity of connected leaf nodes lower than the preset threshold) in the autonomous domain of N1, and return the selected nodes to N1.

Step 3: N1 requests joining the lower-level trunk nodes of the specified sub-trees as a trunk child node. In this embodiment, N1 attempts to join sub-tree s1 to obtain sub-stream s1. N1 establishes connections with the lower-level trunk nodes of sub-tree s1 in the returned information (because a sub-tree may have multiple trunks, the RRS-P may return one or more lower-level trunk nodes), and then requests joining these lower-level trunk nodes in turn as a trunk child node.

If no trunk child node is available in a lower-level trunk node that N1 requests joining, the lower-level trunk node accepts the request of N1. N1 disconnects the connections with other lower-level trunk nodes, and reports its own connection relationship to the RRS-P. If a trunk child node is already available in a lower-level trunk node, the lower-level trunk node returns the information about the trunk child node to N1. N1 adds the trunk child node to the list of candidate nodes, and attempts to establish a connection with the trunk child node. The preceding process is repeated until a trunk node accepts the connection request of N1.

After joining as a trunk child node, N1 receives the information about one or multiple upper-level trunk nodes sent from a trunk parent node, stores the information, and forwards the information to other trunk child nodes.

The level of a trunk node that forwards the node information about an upper-level trunk node may be set according to requirements. For example, a time to live TTL value may be carried in the node information (including IP address and port number information) of each trunk node. After each trunk node receives the node information about one or more upper-level trunk nodes sent from the trunk parent node, the TTL value is decreased by 1. When the TTL value is greater than 0, the trunk node forwards the node information to the trunk child nodes; when the TTL value is equal to 0, the trunk node stops forwarding the node information to the trunk child nodes. Each trunk node determines its own trunk parent node and other upper-level trunk nodes according to the received information about one or more upper-level trunk nodes and the carried TTL value.

For example, supposing each trunk node may store information about four upper-level trunk nodes at most, the following shows the storage format:

((Parent node IP address/port number, 3), (Grandparent node IP address/port number, 2), (Great-grandparent node IP address/port number, 1), (Great-great grandparent node IP address/port number, 0)).

The TTL values corresponding to the parent node, grandparent node, great grandparent node, and great-great grandparent node are 3, 2, 1, and 0.

If no lower-level trunk node receives the requests of N1 due to failures of all the lower-level trunk nodes or because N1 fails to connect to all the lower-level trunk nodes, or if the RRS-P does not return the information about lower-level trunk nodes of sub-tree s1 (at the beginning of establishment of the P2P network topology, the RRS-P cannot return the information about lower-level trunk nodes because no node has joined sub-tree s1 and s1 does not have trunk nodes), N1 requests sub-stream s1 from the ES-P returned by the RRS-P.

Step 4: N1 requests joining the trunk nodes of other sub-trees as a leaf node. The details are as follows:

N1 establishes connections with idle nodes of other sub-trees in the information returned by the RRS-P, and requests joining the idle nodes as a leaf node. If a requested node is idle, it accepts N1 as its leaf node; otherwise, it rejects the request of N1.

Specifically, a requested trunk node accepts the join request of N1 based on the quantity of accepted leaf nodes. If the quantity of leaf nodes connected to the trunk node already reaches the preset threshold, the trunk node is not idle and cannot accept new leaf nodes. If the quantity of leaf nodes connected to the trunk node does not reach the preset threshold, the trunk node establishes a connection with N1 and accepts N1 as its own leaf node.

Moreover, when a trunk node turns from an idle node into a non-idle node after accepting new leaf nodes or when a trunk node turns from a non-idle node to an idle node after some connected leaf nodes exit, the trunk node needs to notify the RRS-P, its trunk parent node and trunk child nodes. When there are new nodes that request joining the system, the RRS-P may return the stored idle nodes to the nodes. In a same trunk, when a trunk node receives the information about idle nodes sent or forwarded by the trunk parent node, the trunk node forwards the received information to lower-level trunk nodes; when a trunk node receives the information about idle nodes sent or forwarded by a trunk child node, the trunk node forwards the received information to upper-level trunk nodes. In this way, each trunk node may know whether multiple nodes are idle. When there are new nodes joining the system as leaf nodes, the trunk node sends the information about known idle nodes to the connected leaf nodes, and also forwards received information about idle nodes to the connected leaf nodes. Thus, a leaf node may timely and accurately know the information about some idle nodes that obtain a sub-stream. When a trunk node connected to the leaf node exits or fails, the leaf node may request the sub-stream from these idle nodes, without requesting the RRS-P, thus reducing the load of the RRS-P.

If N1 fails to find a trunk node to which N1 is connected as a leaf node after several attempts, N1 requests the related sub-stream from the ES-P.

If N1 is not a public network node, N1 may attempt to join all sub-trees as a leaf node, and obtain the sub-streams.

Step 5: After joining sub-tree s1, N1 becomes a lower-level trunk node of sub-tree s1. N1 needs to report its information to the RRS-P, including the trunk node connection relationship and information about whether N1 is idle. In addition, some bandwidths need to be reserved to accept trunk child nodes. N1 may also accept other nodes as leaf nodes.

What has been described above is a major process of joining a network as a watching node by N1. In fact, N1 may also join the network as a help node. When acting as a help node, N1 may only serve as a trunk node of a sub-stream, and does not need to join other sub-trees to obtain other sub-streams.

Figure 8:
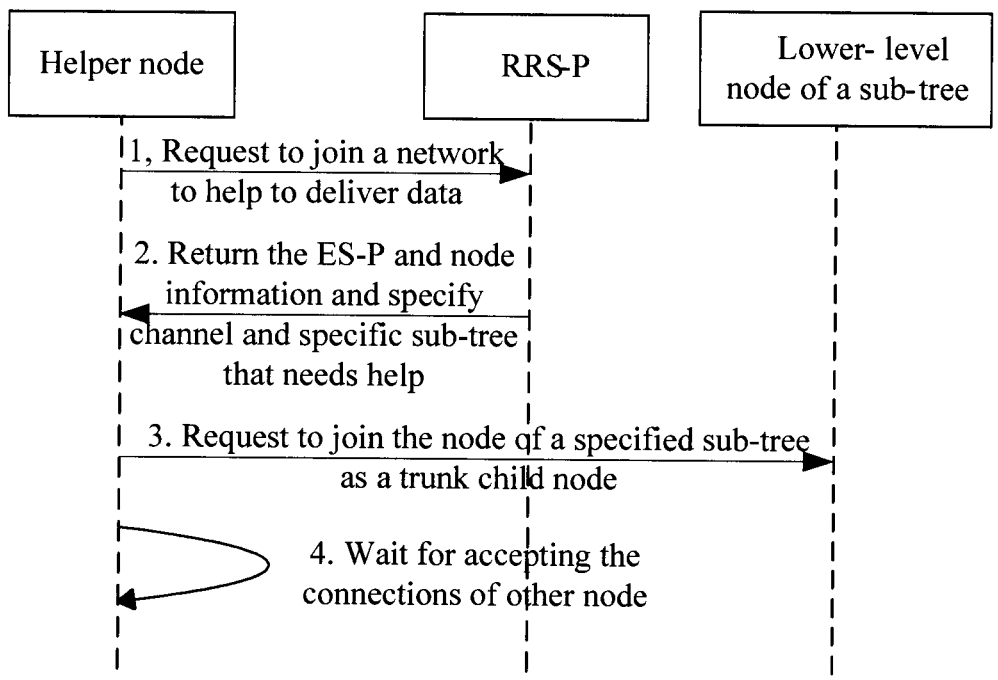
FIG. 8 shows a process for a P2P client to join a streaming delivery system as a help node according to some embodiments.

FIG. 8 shows a process of joining a system as a help node by a P2P client. The process includes the following steps:

Step 1: A P2P client N1 requests joining a P2P network to help to deliver data. N1 sends a message to the RRS-P, where the message carries the IP address and port number of N1.

Step 2: According to the actual IP address of N1, the RRS-P selects one or more ES-Ps that are closer to N1 in the network and have idle resources, and returns the ES-P information to N1. Generally, the RRS-P may select an ES-P with idle bandwidths and light CPU loads that is in the autonomous domain of N1.

The RSS-P may further specify channels and sub-streams that N1 helps to deliver. For example, if the ES-P specifies N1 to deliver sub-stream s1 of a channel, that is, it specifies N1 to join sub-tree s1 as a trunk node, the RRS-P needs to return the information about lower-level trunk nodes of sub-tree s1 that is in the autonomous domain of N1 to N1.

To avoid transmission delay, there cannot be too many trunk node levels in each sub-stream. Thus, each sub-stream may have multiple trunks, and there may be multiple lower-level trunk nodes. The RRS-P needs to return a certain number of lower-level trunk nodes of sub-tree s1 to N1. The trunk levels need to be considered when the RRS-P returns the lower-level trunk nodes. For trunks with more than a certain number of levels, the RRS-P may not return the lower-level trunk nodes to N1.

Step 3: N1 requests joining the lower-level trunk nodes of a specified sub-tree as a trunk child node. N1 attempts to join s1 sub-tree, and establishes connections with the lower-level trunk nodes (one or more) of sub-tree s1 in the information returned by the RRS-P, and then requests joining these lower-level trunk nodes in turn as a trunk child node.

If no trunk child node is available in the lower-level trunk nodes that N1 requests joining, the lower-level trunk nodes accept the request of N1. N1 disconnects the connections with other lower-level trunk nodes, and reports its own connection relationship to the RRS-P. If a trunk child node is already available in a lower-level trunk node that N1 requests joining, the lower-level trunk node returns the information about the trunk child node to N1. N1 continues to connect to the trunk child node. The preceding process is repeated until a trunk node accepts the connection request of N1.

If no lower-level trunk node receives the requests of N1 due to failures of all the lower-level trunk nodes or because N1 fails to connect to all the lower-level trunk nodes, or if the RRS-P does not return the information about lower-level trunk nodes of s1, N1 requests sub-stream s1 from the ES-P returned by the RRS-P.

Step 4: After joining sub-tree s1, N1 becomes a lower-level trunk node of sub-tree s1. Thus, some bandwidths need to be reserved to accept the join requests of trunk child nodes. N1 may also accept other nodes as leaf nodes.

To ensure that these help nodes may use other network applications normally, the help nodes may only occupy some bandwidths as upload bandwidths, that is, the help nodes accept only a preset quantity of leaf nodes and provide sub-streams for such leaf nodes. For example, many users access to the Internet through ADSL, with a common uplink bandwidth of 512 Kbps. The help nodes may be specified to occupy a maximum bandwidth of 250 Kbps for sub-stream delivery.

After becoming a trunk node of a sub-tree, N1 reports the node status information to the RRS-P, including the trunk node connection relationship, information about whether the current node is idle, and information about whether the node is a help node.

Figure 9:
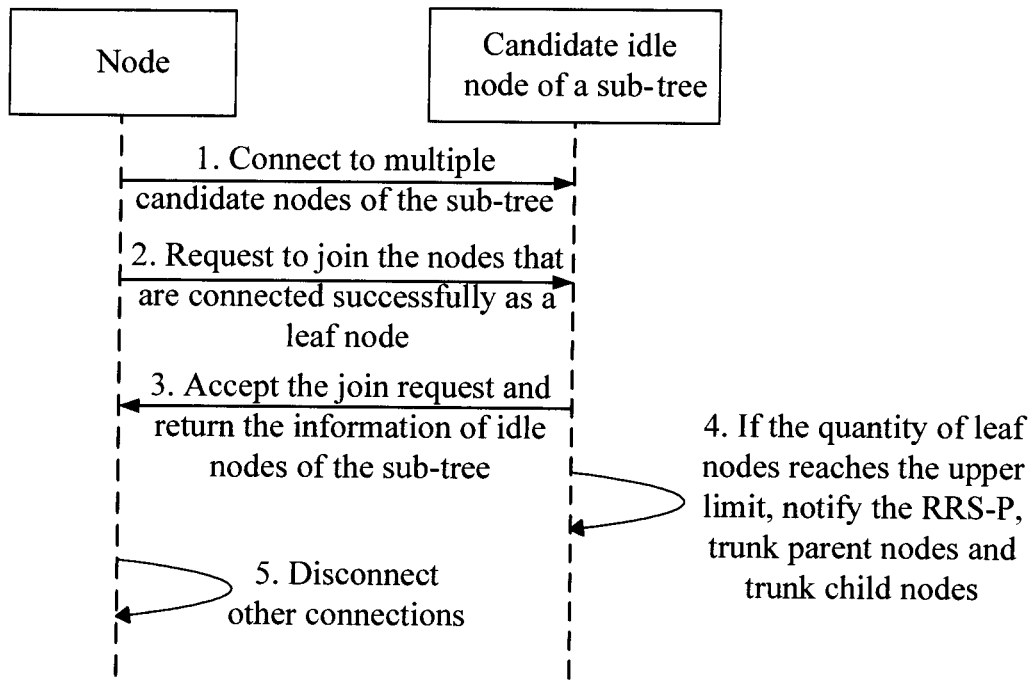
FIG. 9 shows a process a P2P client to join the sub-trees in a P2P network topology as a leaf node according to some embodiments.

FIG. 9 shows a process of joining a sub-tree as a leaf node by a new node or a private network node. The process includes the following steps:

Step 1: A new P2P client N1 sends a connection request to idle nodes of sub-trees s1, s2 to sn.

Step 2: N1 requests joining the connected trunk nodes of each sub-tree as a leaf node.

If no idle node responds to the connection request of N1, that is, no idle node is connected to N1 successfully, the connection fails. Then the process of joining the network as a leaf node ends.

Step 3: If a requested idle node agrees to accept N1 as a leaf node, the idle node returns a response of agreeing N1 to join and information about other locally stored idle nodes to N1, and forwards received information about idle nodes to all the connected leaf nodes. Thus, a leaf node may timely and accurately know the information about some idle nodes that obtain a sub-stream. When a trunk node connected to the leaf node exits or fails, the leaf node may request the sub-stream from these idle nodes, without requesting the RRS-P, thus reducing the load of the RRS-P.

If a requested trunk node rejects the request of N1, N1 disconnects the connection with the trunk node, and deletes the trunk node from the list of candidate idle nodes. Then, N1 goes back to step 2 and continues to send a join request to other idle nodes.

Step 4: If the quantity of leaf nodes connected to the trunk node reaches the preset threshold and the trunk node changes from an idle node to a non-idle node after N1 joins the trunk node, the trunk node needs to notify the RRS-P, trunk parent node and trunk child nodes.

Step 5: N1 accesses the network as a connected leaf node of the trunk node agreeing N1 to join, and disconnects connections with other idle nodes.

In practical applications, after receiving a request for joining a system from a P2P client, the RRS-P may not schedule the request to the trunk if it detects that the number of levels in a trunk reaches a certain threshold. If the number of levels in each trunk of a sub-tree reaches the preset threshold, the RRS-P does not return the information about lower-level trunk nodes to the new nodes that join the system. At this time, the new nodes request the related data sub-streams from the returned ES-P.

Figure 10:
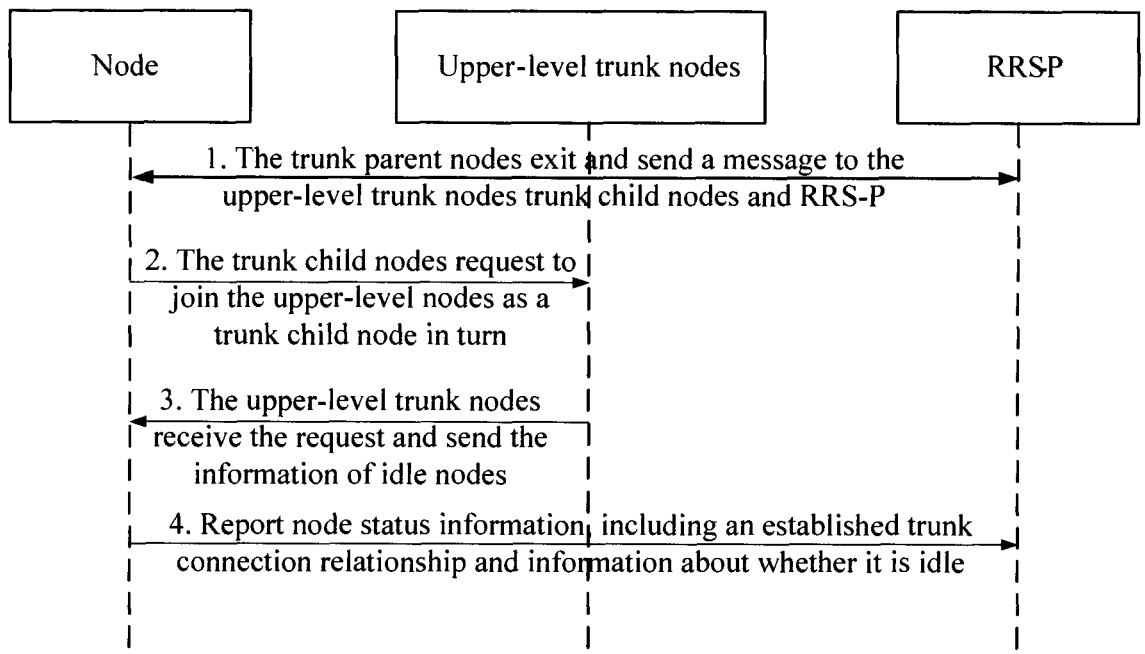
FIG. 10 shows a process for a node to exit a streaming delivery system according to some embodiments.

Accordingly, some embodiments may provide a method for a node to exit a network. FIG. 10 shows a process of handling the disconnection or exit of a trunk parent node by a node. The process includes the following steps:

Step 1: P2P clients N1, N2 and N3 are trunk nodes of sub-tree s1, where N2 is the trunk parent node of N1 and N3 is a trunk child node of N1. N4 is the leaf parent node of N1, and N5 is a leaf node of N1.

When node N1 exits or is disconnected normally, N1 sends an exiting message to the RRS-P, all the parent nodes and child nodes. Trunk child node N3 and leaf node N5 of N1 may receive the exiting message from N1. N3 and N5 may also detect the failure of connection with N1 by scanning the connection status of N1.

Step 2: Node N3 adds the upper-level trunk nodes, that is, trunk parent node N2 and trunk nodes at all levels above N2, to the list of candidate nodes, and sends a request for joining as a trunk child node to N2 and upper-level trunk nodes of N2 in turn. The request sequence is as follows: N2, parent node of N2, and grandparent node of N2 send a request to the upper-level trunk nodes of a sub-tree in turn.

After receiving the exiting message from N1 or detecting that N1 exits, the RRS-P deletes N1 related information from the trunk topology data of N1.

After receiving the exiting message from N1 or detecting that N1 exits, trunk parent node N2 deletes the connection information about N1, so that N2 may accept the requests of other nodes for joining as trunk child nodes.

After receiving the exiting message from N1 or detecting that N1 exits, a leaf parent node N4 of N1 deletes N1 related information. Further, the leaf parent node needs to judge whether the quantity of connected leaf nodes is smaller than the preset threshold. If so, the leaf parent node determines that it changes to an idle node, and notifies the RRS-P, trunk parent nodes and trunk child nodes. The RRS-P updates the information about locally stored idle nodes. The trunk parent nodes and trunk child nodes of N4 update the information about locally stored idle nodes, and forward the updated information to upper-level/lower-level trunk nodes and connected leaf nodes.

After receiving the exiting message or detecting that N1 exits, leaf node N5 of N1 attempts to obtain sub-streams from the locally recorded idle trunk nodes of sub-tree s1. The data of locally recorded idle trunk nodes of each sub-tree has two sources: data returned by the RRS-P at system access and data of idle nodes obtained from N1. If the locally recorded idle trunk nodes cannot provide sub-stream s1, leaf node N5 requests the information about idle trunk nodes from sub-tree s1, and then requests joining these nodes to obtain the sub-stream. If N5 still cannot obtain sub-stream s1, it requests sub-stream S1 from the ES-P.

Step 3: After receiving a connection request from N3, N2 receives the request of N3 for joining as a trunk child node if no trunk child node is available. If N2 rejects the request of N3, N2 returns a reject message to N3. N3 reports the failure of N2 to the RRS-P, and continues to send a join request to the upper-level trunk nodes of N2.

After receiving the join request from N3, the upper-level trunk nodes report the information about idle nodes to N3.

If N3 fails to establish connections with the upper-level trunk nodes and join the sub-tree as a trunk child node after several attempts, N3 requests the sub-stream from the ES-P. The number of attempts to establish connections is set according to the number of upper-level trunk nodes stored in each trunk node; for example, each trunk node may be set to store a maximum of four upper-level trunk nodes. The format is as follows:

((Parent node IP address/port number, 3), (Grandparent node IP address/port number, 2), (Great-grandparent node IP address/port number, 1), (Great-great grandparent node IP address/port number, 0)). Thus, a maximum of three attempts may be made.

Step 4: N3 reports the node status information to the RSS-P, including the established trunk connection relationship and information about whether nodes at each level are idle.

After the new trunk connection relationship is established, N3 updates the information about its own upper-level trunk nodes, and sends the updated information to the connected trunk child nodes.

When N1 exits the system, N1 notifies leaf parent node N4. When receiving the exit notification of N1 or detecting that N1 exits, N4 needs to judge whether the quantity of connected leaf nodes is smaller than the preset threshold. If so, N4 determines that it changes to an idle node, and notifies the RRS-P, trunk parent nodes and trunk child nodes. The RRS-P updates the information about locally stored idle nodes. The RRS-P updates the information about locally stored idle nodes. Trunk parent nodes and trunk child nodes of N4 update the information about locally stored idle nodes, and forward the updated information to upper-level/lower-level trunk nodes and connected leaf nodes.

Therefore, in some embodiments, by using constructing the P2P network topology and utilizing the upload capabilities of P2P clients to transmit a part of streaming data between the P2P clients, the content server resources may be saved. In addition, the RRS-P constructs the P2P network topology, specifies the transmitted data sub-streams and sends information about idle nodes on a unified basis, and limits the connection between the P2P clients in a partial network, thus guaranteeing the transmission quality and reducing cross-network transmission traffic.

All or part of the disclosed embodiments may be implemented through software programming. The software program may be stored in a readable storage medium, such as a hard disk, a compact disk, or a floppy disk.

It is apparent that those skilled in the art may make various modifications and variations to the disclosed embodiments without departing from the scope of the embodiments. The disclosed embodiments are intended to cover these modifications and variations provided that they fall in the scope of protection defined by the following claims or their equivalents.

What is claimed is:

1. A streaming delivery system, comprising:
   a center server adapted to slice streaming data into multiple data sub-streams and send the multiple data sub-streams;
   an edge server adapted to buffer the data sub-streams sent from the center server and send the data sub-streams to a client joining the system; and
   a request scheduling server adapted to establish, store, and update information about a network topology and idle nodes,
   wherein the request scheduling server is adapted to receive a request for joining the system sent from the client, return information about available edge servers to the client, and return identifiers (IDs) of specified data sub-streams transmitted by the client,
   wherein the request scheduling server is adapted to determine that sub-trees corresponding to the specified data sub-streams have lower-level trunk nodes, determine whether a quantity of the lower-level trunk nodes reaches a first preset threshold amount, return information about the lower-level trunk nodes when the quantity of the lower-level nodes does not reach the first preset threshold amount, and create a new trunk when the quantity of the lower-level trunk nodes reaches the first preset threshold amount, and
   wherein the request scheduling server is adapted to receive an indication of a second preset threshold amount from the client and join the client to the system as a trunk node that is able to support a number of leaf nodes up to the second preset threshold amount.

2. The system of claim 1, wherein the first preset threshold amount is determined based at least in part on an amount of transmission delay between the lower-level nodes, wherein the second preset threshold amount is determined based at least in part on a bandwidth capability of the client, and wherein the system further comprises one or more additional edge servers, wherein neighboring edge servers form an edge node to node (P2P) autonomous domain, and wherein the edge servers in a same P2P autonomous domain share received data sub-streams.

3. A method for constructing a network topology, comprising:
   receiving a request sent by a client for joining a system;
   returning information about available edge servers to the client;
   returning identifiers (IDs) of specified data sub-streams transmitted by the client;
   determining that sub-trees corresponding to the specified data sub-streams have lower-level trunk nodes;
   determining whether a quantity of the lower-level trunk nodes reaches a first preset threshold amount;
   returning information about the lower-level trunk nodes of the sub-trees when the quantity of the lower-level trunk nodes does not reach the first preset threshold amount;
   creating a new trunk when the quantity of the lower-level trunk nodes reaches the first preset threshold amount;
   receiving an indication of a second preset threshold amount; and
   joining the client to the system as a trunk node that is able to support a number of leaf nodes up to the second preset threshold amount.

4. The method of claim 3, wherein the first preset threshold amount is determined based at least in part on an amount of transmission delay between the lower-level trunk nodes, wherein the second preset threshold amount is determined based at least in part on a bandwidth capability of the client, wherein each sub-tree comprises one or more trunks, wherein each trunk node comprises only one trunk child node and is connected to one or more leaf nodes, wherein each of the trunk nodes and each of the leaf nodes is a client, and wherein each client is used as a trunk node of only one trunk and is used as a leaf node of multiple sub-trees.

5. The method of claim 3, wherein the request sent by the client indicates whether the client wants to join the system as a watching node or as a helping node, wherein the client is joined to the system as both the trunk node and as a leaf node when the request indicates that the client wants to join the system as the watching node, wherein the client is joined to the system as the trunk node only and not as the leaf node when the request indicates that the client wants to join the system as the helping node, wherein the sub-trees comprise n sub-trees, wherein n corresponds to a quantity of data sub-streams sent by a center server to the edge servers, and wherein each sub-tree is used to transmit one of the data sub-streams.

6. The method of claim 5, wherein initial values of trunk nodes and leaf nodes of each sub-tree are null, and wherein the method further comprises:
   specifying n clients that are connected first as first trunk nodes of the sub-trees that transmit each data sub-stream;
   returning the information about available edge servers, information about the specified data sub-streams transmitted by the n clients, and information about idle nodes that transmit other data sub-streams to the n clients;
   updating a time to live (TTL) value of each of the trunk nodes;
   forwarding the information about the idle nodes when the TTL value is greater than 0; and
   stop forwarding the information about the idle nodes when the TTL value is equal to 0.

7. The method of claim 6, further comprising:
   instructing the client to obtain the specified data sub-streams that are transmitted from the returned edge servers when the quantity of the lower-level trunk nodes reaches the first preset threshold amount; and
   generating a number of redundant data sub-streams, wherein the number of redundant data sub-streams is determined based at least in part using a Reed-Solomon redundancy algorithm.

8. The method of claim 3, wherein after receiving the request for joining the system sent from the client, the method further comprises:
determining that there are idle nodes that transmit other data sub-streams and that the client requests joining the system as a watching node;
returning information about one of the idle nodes that transmits the other data sub-streams to the client, wherein the one of the idles nodes comprises a trunk node of which a quantity of connected leaf nodes does not reach the second preset threshold amount; and
selecting the one of the idle nodes based on a distance between the client and the one of the idle nodes within the network topology, wherein the one of the idle nodes that is selected is closer to the client within the network topology than the idle nodes that are not selected.

9. The method of claim 3, further comprising:
receiving node status information reported by the client, wherein the node status information comprises a trunk node connection relationship and information about whether a current node is idle, wherein the node status information is reported according to information about connected trunk nodes and quantity of leaf nodes, and wherein the current node is determined to be idle when the quantity of leaf nodes is less than the second preset threshold amount; and
updating information about locally stored network topology and idle nodes according to the received node status information.

10. The method of claim 3, further comprising:
scanning a connection status of the client to detect a connection status of the client; and
updating a locally stored network topology after receiving a system exiting message sent from the client or after detecting that the connection status of the client indicates that the client has exited the system for exceptional reasons.

11. The method of claim 3, further comprising:
establishing a maximum number of attempts to establish a connection with an existing sub-tree; and
requesting a data sub-stream from one of the available edge servers instead of the existing sub-tree when the maximum number of attempts has been exceeded,
wherein the maximum number of attempts to establish the connection with the existing sub-tree is based at least in part on a number of upper-level trunk nodes.

12. The method of claim 3, further comprising selecting one of the lower-level trunk nodes of the sub-trees based at least in part on bandwidths and central processing unit loads of the sub-trees, wherein the one of the lower-level trunk nodes that is selected has more idle resources and a lower central processing unit load than the lower-level trunk nodes that are not selected.

13. The method of claim 3, wherein the client comprises a trunk of one of the sub-trees and a leaf of each of the other sub-trees, wherein the client is configured to receive and forward the data sub-stream associated with the one of the sub-trees, and wherein the client is configured to only receive the data sub-streams associated with the other sub-trees.

14. A request scheduling server, comprising:
a receiving unit adapted to receive a request, initiated by a client, for joining a system; and
an information delivering unit adapted to use a processor to: return information about available edge servers to the client, return identifiers (IDs) of specified data sub-streams transmitted by the client, determine that sub-trees corresponding to the specified data sub-streams have lower-level trunk nodes, determine whether a quantity of the lower-level trunk nodes reaches a first preset threshold amount, return information about the lower-level trunk nodes when determining that the quantity of the lower-level trunk nodes does not reach the first preset threshold amount, create a new trunk when the quantity of the lower-level trunk nodes reaches the first preset threshold amount, receive an indication of a second preset threshold amount from the client, and join the client to the system as a trunk node that is able to support a number of leaf nodes up to the second preset threshold amount.

15. The request scheduling server of claim 14, wherein the first preset threshold amount is determined based at least in part on an amount of transmission delay between the lower-level trunk nodes, wherein the second preset threshold amount is determined based at least in part on a bandwidth capability of the client, wherein the receiving unit is further adapted to receive node status information comprising a trunk node connection relationship and information about whether the current node is idle that is reported by the client after the client joins the system, and wherein the request scheduling server further comprises an updating unit adapted to update information about a locally stored network topology and idle nodes according to node status information received by the receiving unit.

16. The request scheduling server of claim 14, further comprising a detecting unit adapted to detect whether the client exits the system and update a locally stored network topology when detecting that the client exits for exceptional reasons, wherein the request initiated by the client indicates whether the client wants to join the system as a watching node or a helping node, wherein the client is joined to the system as both the trunk node and as a leaf node when the request indicates that the client wants to join the system as the watching node, and wherein the client is joined to the system as the trunk node only and not as the leaf node when the request indicates that the client wants to join the system as the helping node.

17. A method for a client to join a streaming delivery system, comprising:
originating a request for joining a system to a request scheduling server;
determining that sub-trees corresponding to specified data sub-streams have lower-level trunk nodes;
determining whether a quantity of the lower-level trunk nodes reaches a first preset threshold;
receiving information about edge servers returned by the request scheduling server, identifiers (IDs) of the specified data sub-streams transmitted, and information about the lower-level trunk nodes returned when the quantity of the lower-level trunk nodes does not reach the first preset threshold;
creating a new trunk when the quantity of the lower-level trunk nodes reaches the first preset threshold amount;
establishing connections with the edge servers or one of the lower-level trunk nodes;
joining the sub-trees as a trunk node to receive the specified data sub-streams;
transmitting the specified data sub-streams to connected leaf nodes;
sending an indication of a second preset threshold amount to the request scheduling server; and reporting node status information that comprises a trunk node connection relationship and information about whether the current node is idle to the request scheduling server when acting as a trunk node, wherein the current node is reported to the request scheduling server as being idle when the current node is acting as the trunk node and when a number of the connected leaf nodes supported by the current node is less than the second preset threshold amount.

18. The method of claim 17, wherein the first preset threshold amount is determined based at least in part on an amount of transmission delay between the lower-level trunk nodes, wherein the second preset threshold amount is determined based at least in part on a bandwidth capability of the client, and wherein the request for joining the system indicates whether the client wants to join the system as a watching node or a helping node.

19. The method of claim 18, wherein the request indicates that the client wants to join the system as the watching node, and wherein the method further comprises:
    receiving information about idle nodes that transmit other data sub-streams returned by the request scheduling server;
    establishing connections with the received idle nodes that transmit other data sub-streams;
    acting as a leaf node of sub-trees corresponding to the other data sub-streams to receive the other data sub-streams;
    combining the received other data sub-streams into streaming data; and
    playing the streaming data using a local player.

20. The method of claim 19, further comprising:
    originating, by the client, the request for joining a system carrying the client's Internet Protocol (IP) address and port number to the request scheduling server;
    identifying, by the request scheduling server, that the client is a private network node when determining that the IP address and the port number carried in the request for joining the system are different from actual IP address and port number information;
    returning only the information about edge servers and idle nodes transmitting other data sub-streams to the client; and
    forming an autonomous peer-to-peer domain using neighboring edge servers,
    wherein each edge server in the autonomous peer-to-peer domain shares a same one of the data sub-steams.

* * * * *

UNITED STATES PATENT AND TRADEMARK OFFICE
CERTIFICATE OF CORRECTION

| | | |
|---|---|---|
| PATENT NO. | : 8,612,621 B2 | Page 1 of 1 |
| APPLICATION NO. | : 12/505788 | |
| DATED | : December 17, 2013 | |
| INVENTOR(S) | : Zhibing Wang et al. | |

It is certified that error appears in the above-identified patent and that said Letters Patent is hereby corrected as shown below:

Title Page 1, References Cited, under Other Publications, the following cited art should read:

"English Translation of Written Opinion of the International Searching Authority for PCT Application No. PCT/CN2008/071072, mailed Aug. 28, 2008, 4 pp."

Title Page 2, References Cited, under Other Publications, the following cited art should read:

"Tian, Ruixiong, et al., "HAG-Based Application Layer Multicast System for Streaming Media", J. Tsinghua University (Science and Technology), 2004, vol. 44, No. 4, 1994-2010 China Academic Journal Electronic Publishing House, 5 pp.

Xu, Dongyan, et al., "Analysis of a CDN-P2P Hybrid Architecture for Cost-Effective Streaming Media Distribution", Multimedia Systems, Springer, Berlin, Germany, vol. 11, No. 4, Apr. 1, 2006, pp. 383-399."

In the Claims

Claim 2, Column 15/Line 65 should read: "peer-to-peer (P2P) autonomous domain, and wherein the"

Claim 8, Column 17/Line 12 should read: "wherein the one of the idle nodes comprises a trunk"

Claim 20, Column 20/Line 15 should read: "joining the system are different from the actual IP address"

Claim 20, Column 20/Line 23 should read: "domain shares a same one of the data sub-streams."

Signed and Sealed this
Eleventh Day of March, 2014

Michelle K. Lee
*Deputy Director of the United States Patent and Trademark Office*